(12) United States Patent
Schmierer et al.

(10) Patent No.: US 11,518,310 B2
(45) Date of Patent: Dec. 6, 2022

(54) LIGHTING DEVICE, REAR-VIEW DEVICE AND MOTOR VEHICLE

(71) Applicant: Motherson Innovations Company Limited, London (GB)

(72) Inventors: Arne Schmierer, Stuttgart (DE); Volker Erhart, Stuttgart (DE); Levente Acs, Stuttgart (DE); Mikhail Kudryavtsev, Stuttgart (DE); Tobias Schwenger, Stuttgart (DE); Oliver Schmidt, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 259 days.

(21) Appl. No.: 16/772,719

(22) PCT Filed: Dec. 14, 2018

(86) PCT No.: PCT/EP2018/084896
§ 371 (c)(1),
(2) Date: Jun. 12, 2020

(87) PCT Pub. No.: WO2019/115746
PCT Pub. Date: Jun. 20, 2019

(65) Prior Publication Data
US 2020/0317131 A1 Oct. 8, 2020

(30) Foreign Application Priority Data

Dec. 15, 2017 (DE) .......................... 102017130246.8
Sep. 4, 2018 (DE) .......................... 102018121580.0

(51) Int. Cl.
*B60R 1/12* (2006.01)
*B60R 1/06* (2006.01)

(52) U.S. Cl.
CPC .............. *B60R 1/1207* (2013.01); *B60R 1/06* (2013.01); *B60R 2001/1253* (2013.01)

(58) Field of Classification Search
CPC ................................ B60R 1/1207; B60R 1/06
See application file for complete search history.

(56) References Cited

U.S. PATENT DOCUMENTS

| 4,274,078 A | 6/1981 | Isobe et al. |
| 7,600,905 B2 | 10/2009 | Geiger et al. |
| 8,072,318 B2 | 12/2011 | Lynam et al. |
| 9,434,313 B2 | 9/2016 | Minikey, Jr. et al. |

(Continued)

FOREIGN PATENT DOCUMENTS

WO   WO 2016/117254 A1   7/2016

OTHER PUBLICATIONS

International Search Report dated Apr. 4, 2019 of International application No. PCT/EP2018/084896.

(Continued)

*Primary Examiner* — Thomas M Sember
(74) *Attorney, Agent, or Firm* — Jones Day

(57) ABSTRACT

A lighting device of a rear view device of a motor vehicle, includes at least one light source with at least one light emitter for emitting light which can be coupled into and out of a light guide with at least one light funnel in order to pass at least through part of a light transmission unit and illuminate an area adjacent to the motor vehicle, where each light funnel extends upward or downward from its light input end to its light output end, and each light emitter is associated with a light funnel determining an optical axis.

27 Claims, 5 Drawing Sheets

(56) References Cited

U.S. PATENT DOCUMENTS

2011/0170307 A1 7/2011 Ishikawa et al.
2015/0003089 A1 1/2015 Lynam
2017/0210282 A1 7/2017 Rodriguez Barros

OTHER PUBLICATIONS

Written Opinion dated Apr. 4, 2019 of International application No. PCT/EP2018/084896.

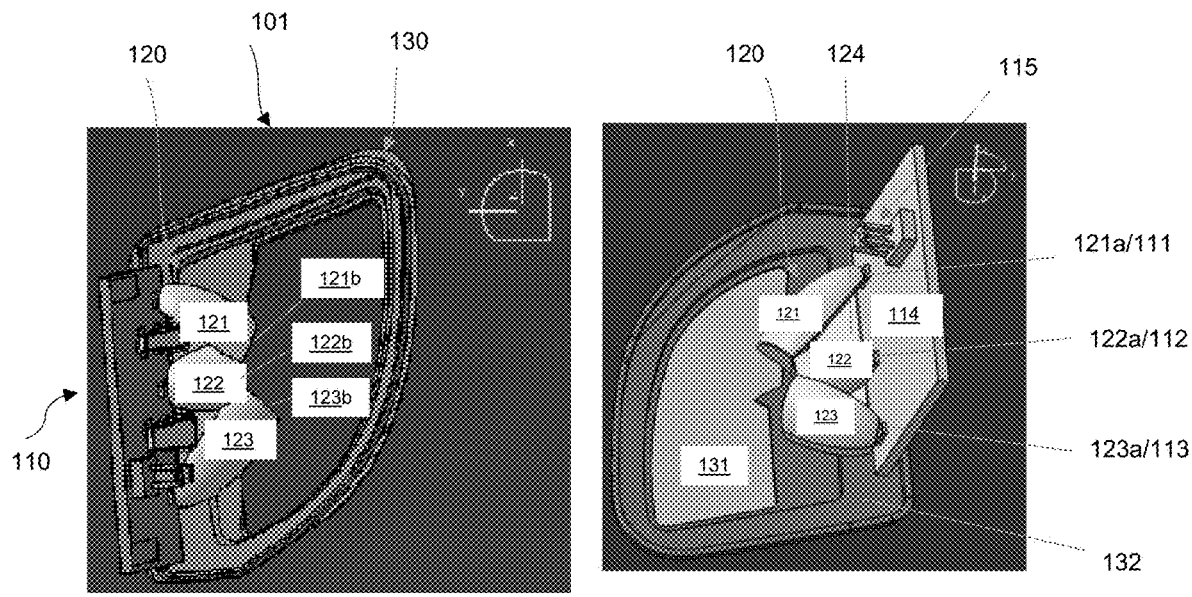
Fig. 7
Fig. 8
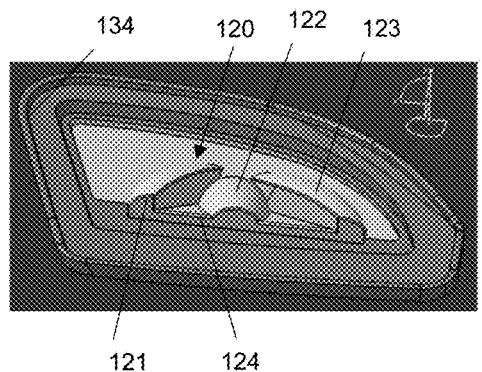
Fig. 9
Fig. 10
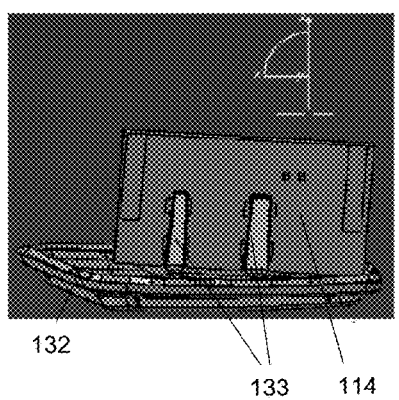
Fig. 11
Fig. 12

LIGHTING DEVICE, REAR-VIEW DEVICE AND MOTOR VEHICLE

CROSS-REFERENCE TO RELATED APPLICATIONS

This application is a National Stage Entry of International Patent Application No. PCT/EP2018/084896, filed Dec. 14, 2018, which claims the benefit of priority to German Patent Application No. DE 10 2018 121 580.0, filed Sep. 4, 2018, and German Patent Application No. DE 10 2017 130 246.8, filed Dec. 15, 2017, each of which is hereby incorporated by reference in its entirety for all purposes.

BACKGROUND

1. Field of the Invention

The present invention relates to an lighting device of a rear view device of a motor vehicle, comprising at least one light source with at least one light emitter, in particular in the form of an LED, for emitting light which can be coupled into and out of a light guide with at least one light funnel in order to pass at least through a part of a light transmission unit and illuminate an area adjacent to the motor vehicle, in particular a road surface of the motor vehicle. It also refers to a rear view device having such an lighting device and a motor vehicle therewith.

2. Related Art

A rear view device is a type of device which generally complies with the legal requirements for rear view devices in vehicles, in particular motor vehicles. Thus, such a rear view device provides an image of the rear area at least corresponding to the legal regulations, essentially in the same way as, for example, in the state of the art the image or the image of the rear area can be provided by an interior mirror or a camera system with display device, and the lateral and rear areas lying obliquely to the side, essentially in the same way as, for example, in the state of the art the image or the image of the lateral or obliquely lateral rear area can be provided by exterior rear view mirrors or camera systems with display devices. Such a rear view device is a subset of a device for indirect vision and the tasks and solutions presented here in the invention can accordingly also be applied to devices for indirect vision. Examples are images and views of objects which are not within the driver's field of vision, i.e. the directions opposite, left, right, below and above the direction of vision, but also the direction of vision of the driver and/or any combination of these directions may be included. Indeed, the driver's view may not be fully satisfactory, in particular also in the direction of vision, for example, there may be obstructions to vision caused by parts of the driver's own vehicle, such as parts of the carriage, in particular the A-pillar, the roof structure and/or the bonnet, and obstructions to vision caused by other vehicles and/or objects outside the vehicle which may obstruct vision in such a way that the driver is unable to grasp the situation fully satisfactorily or only partially. In addition, the driver may not be able to grasp the situation presented to him in or away from the line of vision in the way that would be necessary to control the vehicle according to the situation. Therefore, a rear-view device may also be designed to process the information according to the driver's abilities in order to give him the best possible understanding of the situation.

A rear-view device may also be equipped with various lighting devices. Various other functions and devices may be incorporated in rear view devices and/or controlled by means of rear view devices, including in particular camera systems.

Particularly useful are functions and devices to improve, extend and/or maintain the functionality of the rear view device under normal or extreme conditions. This may include heating and/or cooling means, cleaning means such as wipers, liquid and/or gaseous sprays, actuator means for moving the rear view device or parts thereof, such as a display, a camera system and/or parts of a camera system comprising for example lenses, filters, light sources, adaptive optics such as deformable mirrors, sensors and/or mirrors, and/or actuator means for inducing movements of other objects, for example parts of the vehicle and/or objects surrounding the vehicle. Furthermore, the rear view device may comprise linear guides and/or rotating wheels, such as a filter wheel, for exchanging optical elements, for example comprising lenses, mirrors, light sources, sensors, adaptive optics such as deformable mirrors and/or filters.

Significant examples of functions and devices integrated into and/or controlled by rear-view devices include lighting devices, for example any type of light module such as an external light module, an internal light module, a front light, a rear light, a front fog light, a brake light, an accelerator light, a flashing light, a logo light, an apron light, a ground light, a puddle light, a strobe light, a navigation light, a position light, an emergency light, a headlamp, a green light, a red light, a warning light, a flashing light module, a proximity light, a search light, an information light, an indicator and/or any combination thereof Other examples of functions and devices integrated into and/or controlled by rear-view devices may include a fatigue detection system, a microsleep detection system, a distance and/or speed determination system, such as a LIDAR (light detection and distance sensing) system, a blind spot indication system, a lane change assistant system, a navigation assistance system, a tracking assistant system, a man-machine interaction system, a machine-machine interaction system, an emergency and precautionary assistance system, such as an accident avoidance assistance system, a countermeasure assistance system, a brake assistance system, a steering assistance system, an acceleration assistance system, an escape assistance system comprising for example an ejection seat system, a direction indicator, a blind spot indicator, a proximity system, a heavy braking system, an emergency braking system, a charge status indicator, a vehicle mode system comprising for example a sport mode system, an economy mode system, an autonomous driving mode system, a sleep mode system and/or an anti-theft system, a vehicle locked indication system, a vehicle stolen display, a warning signal system, a temperature indicator system, a weather indication system, a traffic light signal system, a fuel status system and/or any combination thereof.

An example of a rear view device with a lighting device fulfilling the functions of a stop lamp is disclosed in German patent application No 102012108488 filed on 11 Sep. 2012 under the title REAR VIEW DEVICE FOR A MOTOR VEHICLE, the contents of which are hereby incorporated by reference in this application. A light guide unit for a lighting device used in a rear-view system is disclosed in German patent application No 102012104529 filed on 25 May 2012 under the title LIGHT DIRECTION UNIT, the contents of which are hereby incorporated by reference in this application. A lighting device for a rear view device is disclosed in German patent application No 102012107833, filed on 24

Aug. 2012 under the title LIGHTING DEVICE AND REAR VIEW DEVICE, the contents of which are hereby incorporated by reference in this application. A lighting device for a rear unit is disclosed in German patent application No 102012107834 filed on 24 Aug. 2012 under the title LIGHTING DEVICE AND REAR VIEW DEVICE, the contents of which are hereby incorporated by reference in this application. A housing and display device of a rear view device is disclosed in European Patent No. 2738043, filed on Dec. 3, 2012, under the title HOUSING AND DISPLAY DEVICE, the contents of which are hereby incorporated by reference in this application. An optical light guide for a vehicle lighting unit is disclosed in European Patent No 2947378, filed on 22 May 2014 under the title OPTICAL LIGHT GUIDE FOR A VEHICLE LIGHTING UNIT, the contents of which are hereby incorporated by reference in this application. An indicating device of a rear view device of a vehicle is disclosed in the international patent application No. 2015/173695 filed on May 7, 2015, under the title DISPLAY DEVICE, REAR VIEW DEVICE AND MOTOR VEHICLE REAR VIEW DEVICE, the priority of the European patent application No. 2944866, filed on 12 May 2014 under the title OPTICAL UNIT, DISPLAY DEVICE, REAR VIEW DEVICE AND MOTOR VEHICLE INCLUDING THE SAME, the contents of which are hereby all incorporated by reference in this application. Furthermore, European patent application No. 3045944, filed on Jan. 19, 2015, under the title LIGHT GUIDING DEVICE, discloses a light guiding device for a lighting device, in particular for a motor vehicle or a display device, in a rear view device of a motor vehicle and the contents of which are hereby all incorporated by reference into this application. Furthermore, in U.S. patent application Ser. No. 15/228,566, filed on Aug. 4, 2016, under the title LIGHT-GUIDING DEVICE, a light guiding device for a lighting device, in particular for a motor vehicle or a display device in a rear view device of a motor vehicle is disclosed and which is a continuation-in-part of U.S. patent application Ser. No. 15/000,733, filed on Jan. 19, 2016, under the title LIGHT-GUIDING DEVICE, the contents of which are hereby all incorporated by reference into this application. Furthermore, International Patent Application No. 2016/147154, filed on Mar. 18, 2016, under the title LIGHTING DEVICE AND METHOD FOR PRODUCING AN LIGHTING DEVICE, discloses a lighting device, in particular for a rear view device of a motor vehicle and a method of manufacturing the same, which has the priority of German Patent Application No. 102015104163, filed on 19 Mar. 2015 under the title LIGHTING DEVICE AND METHOD FOR THE MANUFACTURE OF A LIGHTING DEVICE, and the contents of which are hereby incorporated by reference in this application. An improved rear view device for a motor vehicle containing an electronic device is disclosed in U.S. patent application Ser. No. 15/256,532, filed on Sep. 3, 2016, under the title ELECTRONIC DEVICE AND REFERENCE DEVICE, and the priority of European Patent Application No. 3139711, filed on Sep. 3, 2015, under the title ELECTRONICS DEVICE AND REAR VIEW DEVICE and the contents of which are hereby incorporated by reference in this application. A lighting device for a rear-view device or a foot well device of a vehicle with at least one lamp is disclosed in German patent application No 102015115555 filed on 9 Sep. 2015 under the title LIGHTING DEVICE, REAR-VISION DEVICE, FOOT-SEATING DEVICE AND VEHICLE, the contents of which are hereby incorporated by reference in this application. A light module for a light arrangement of an exterior rear view device is disclosed in European patent application No. 3138734, filed on Sep. 3, 2015, under the title LIGHT MODULE, LIGHT ASSEMBLY AND REAR VIEW DEVICE FOR A VEHICLE, the contents of which are hereby incorporated by reference in this application. A lighting device for a vehicle component, in particular for a rear-view device of a motor vehicle, comprising a logo light and a deflecting mirror, which was the subject of European patent application No 3144183 filed on 13 Dec. 2003. A lighting device for a vehicle component, in particular for a rear-view device of a motor vehicle with a logo light, vehicle components and a deflecting mirror, disclosed in European patent application No. 3144183 filed on 13 Sep. 2016 entitled LIGHTING DEVICE, VEHICLE COMPONENT AND VEHICLE, and claiming the priority of German utility model application No. 202015104894 filed on 15 Sep. 2015 entitled LIGHTING DEVICE, VEHICLE COMPONENT AND VEHICLE, the contents of which are hereby incorporated by reference in this application. An indicator device and a method for operating an indicator device for a motor vehicle is disclosed in European Patent No. 2 830 305 B1, filed on 24 Jul. 2013 under the title DISPLAY DEVICE FOR A MOTOR VEHICLE AND METHOD FOR OPERATING SUCH A DISPLAY DEVICE, the contents of which are hereby incorporated by reference in this application.

The European patent EP 1 326 764 B1 describes a mirror system comprising a mirror support portion for supporting a mirror glass, wherein a portion forming part of the outside viewing surface of the assembled mirror is continuous to an outside surface of a mirror cover which is replaceable attached to the support portion, the contents of which are hereby incorporated by reference in this application. The European patent EP 2 253 510 B1 describes a rear-view mirror assembly comprising at least two parts from the group described as: mirror frame, mirror base, mirror housing, mirror bezel, mirror glass, mirror illuminant, glass control element, which must be connected to at least one support bar during assembly. This holding latch comprises a circular holding latch flap and a rectangular holding latch arm formed in a first part, which can be inserted into an opening and moved along a slot in a second part, the contents of which are hereby incorporated by reference in this application.

In particular, a camera system may comprise a large number of different optical elements, including, inter alia, a large number of different sensors and light sources, and housing components.

The housing of a camera system may be made of plastic, metal, glass, another suitable material and/or any combination thereof and may be used in combination with the techniques described below to change or modify the properties of the material or the material surface. Housings are disclosed, for example, in German patent application No. 102016108247.3, filed on May 3, 2016, under the title CLEANING SYSTEM FOR A CAMERA, and U.S. patent application Ser. No. 15/281,780, filed on Sep. 30, 2016, under the title TELESCOPIC REVIEW ARRANGEMENT WITH CAMERA AND LENS WIPER SYSTEM, and their contents are hereby incorporated by reference into this application.

The camera may include, for example, CCD or CMOS or light field sensors as contained, for example, in German patent application No 102011053999, filed on 28 Sep. 2011 under the title RECORDING SYSTEM, MOTOR VEHICLE AND DRIVER REGISTRATION SYSTEM and U.S. patent application Ser. No. 09/771,140, filed on 26 Jan. 2001 under the title MONITORING DEVICE FOR VEHICLES, IN PARTICULAR, MOTOR VEHICLES and now U.S. Pat. No. 6,703,925, the contents of which are hereby incorporated by reference into this application. Also, an area of the sensor may be reserved for various purposes, such as for detecting a test beam, as described in U.S. Pat. No. 8,031,224, which was filed on Sep. 9, 2014 under the title CAMERA SYSTEM, METHOD FOR OPERATION OF A CAMERA SYSTEM AND SENSOR DEVICE OF A CAMERA SYSTEM, the contents of which are hereby incorporated by reference into this application.

The optical elements may be molded or designed from any type of glass or any other suitable material. Glass is used here in the sense of a non-crystalline amorphous solid that exhibits a glass transition when heated towards the liquid state. It includes for example the group of polymer glasses, metal glasses, silica glasses, but any other suitable material showing the glass transition can also be used. The glass may be either flat, wedge-shaped, rectangular, cylindrical, spherical, conical, elliptical and/or circular, as described, for example, in German patent application No 102016108247.3 and German patent application No 102011103200 filed on 31 May 2011 under the title LIGHT WINDOW and the contents of which are hereby incorporated by reference in this application, or may have a shape according to different needs or types of lenses. As non-restrictive examples, camera systems may be equipped with lenses, such as a wide-angle or fisheye lens capable of providing peripheral images, as described in the U.S. patent application Ser. No. 15/281,780 and U.S. patent application Ser. No. 13/090,127, filed on Apr. 19, 2011 under the title REVIEW MIRROR SIMULATION, now U.S. Pat. No. 9,238,434, a Fresnel lens or micro lenses as described in German Patent Application No. 102011053999, filed on Sep. 28, 2011 under the title SENSOR SYSTEM, MOTOR VEHICLE AND DRIVER ASSISTANCE SYSTEM, and a TIR (Total Internal Reflective Lens) as described in U.S. Pat. No. 8,740,427, filed on Sep. 8, 2010 for OPTIMAL LIGHT COUPLING FOR REAR VIEW DEVICES, the contents of which are hereby incorporated by reference into this application. Another type of optical elements known to be used in camera systems are optical fibres, in particular in the form of fibre bundles and preferably in the form of fibre bundles with an optical head, as described for example in U.S. patent application Ser. No. 09/771,140. Various methods can be used to produce such optical elements, such as the method used in U.S. Pat. No. 8,460,060, filed on 30 Jan. 2009 under the title METHOD FOR CREATING A COMPLEX SURFACE ON A SUBSTRATE OF GLASS, the contents of which are hereby incorporated by reference into this application.

The optical elements may be transparent, as described, for example, in U.S. Pat. No. 8,031,224, German Patent Application No. 102016108247.3 and U.S. patent application Ser. No. 13/242,829, filed on Sep. 23, 2011 under the title CAMERA ARRANGEMENT AND DOOR GRIP FOR A MOTOR VEHICLE, the contents of which are hereby incorporated by reference into this application. But the optical elements may also be semi-transparent, as described in U.S. patent application Ser. No. 09/771,140 and U.S. patent application Ser. No. 13/090,127, the contents of which are hereby incorporated by reference into this application. Furthermore, the optical elements may be fully or partially coated with different types of coatings to achieve different effects, such as anti-reflection coatings as described in U.S. Pat. No. 8,031,224, chromium-based reflective coatings as described in U.S. Pat. No. 9,181,616, filed on Mar. 24, 2009, and chromium-based reflective coatings as described in U.S. Pat. No. 9,181,616, filed on Dec. 24, 2009 under the title CHROMIUM-BASED REFLECTIVE COATING and other coatings, such as those for polymeric substrates as described in the U.S. patent application Ser. No. 14/936,024, filed on Jan. 24, 2012 under the title COATED POLYMERICAL SUBSTRATES and in the U.S. patent application Ser. No. 15/124,310, filed on Feb. 20, 2015 under the title DECORATIVE COATINGS FOR PLASTIC SUBSTRATES, of which the contents are hereby incorporated by reference into this application. Preferably, the optical elements are made of a scratch-resistant material as described, for example, in German patent application No. 102016108247.3, the contents of which are hereby incorporated by reference in this application. The optical elements may have outcoupling structures at specific locations on the optical elements, and an optical film, for example an extrusion film, and a molded coating may be applied as described in German patent application No 102011103200, the contents of which are hereby incorporated by reference into this application. A coating for spectral and stress control is described in U.S. patent application Ser. No. 15/124,310, the contents of which are hereby incorporated by reference into this application. Various filters may be incorporated into the optical elements, such as gray filters or polarizing filters, as described in U.S. patent application Ser. No. 14/809,509, filed on Jul. 27, 2015 under the title LIGHT INTENSITY CONTROL APPARATUS, the contents of which are hereby incorporated by reference into this application. Electrochromic substrates, polymer electrolytes and other charge-conducting media may be included for the optical elements on the basis of the descriptions disclosed in European Patent Application No. 08103179.1 filed on Mar. 31, 2008 under the title PROCESSES FOR PRODUCING ELECTROCHROMIC SUBSTRATES, European Patent No. European Patent No. 2202826, filed on 23 Dec. 2008 under the title POLYMER ELECTROLYTES AND DEVICES CONTAINING THEM, U.S. Pat. No. 7,999,992, filed on 7 Jan. 2005 under the title CHARGE CONDUCTING MEDIUM and U.S. Pat. No. 8,537,451, filed on Mar. 26, 2008, under the title PROCESSES FOR PRODUCING ELECTROCHROMIC SUBSTRATES AND ELECTROCHROMIC ARTICLES MADE THEREFROM, and the contents thereof are hereby incorporated by reference into this application.

The camera system may also be equipped with light intensity control devices as described in U.S. patent application Ser. No. 14/809,509 and light level amplifying tubes as described in U.S. patent application Ser. No. 09/771,140, the contents of which are incorporated by reference in this application. The electrochromic substrates and devices described in European Patent Application No. 08103179.1, European Patent No. 2202826, U.S. Pat. Nos. 7,999,992 and 8,537,451, the contents of which are incorporated by reference in this application, may also be used for this purpose, in the same way as a transflector for transmitting or reflecting light on the basis of a corresponding input signal, as described in German patent application No. 102016106126.3, filed on Apr. 4, 2016, under the title IMAGE SYSTEM, the contents of which are hereby incorporated by reference in this application.

The camera system or a cover adapted to the camera system can be moved with different actuators, drives and/or a flexible track, as described for example in the German application No 102016108247.3 and the U.S. patent application Ser. No. 15/281,780, the contents of which are incorporated by reference in this application. An actuator device for a rear view device of a motor vehicle, comprising at least one retaining element, an adjusting element, at least one drive means with at least one shape memory element and at least one thermal conduction means, is described in the U.S. patent application Ser. No. 15/165,417, filed on May 26, 2016 under the title ACTUATOR DEVICE FOR A REARVIEW DEVICE OF A MOTOR VEHICLE, which claims the priority of European Patent No. 3 098 444 B1, filed on May 29, 2015 under the title ACTUATOR DEVICE FOR A REARVIEW DEVICE OF A MOTOR VEHICLE, all of which are hereby incorporated herein by reference. An adjustment unit for a rear view device for a vehicle, comprising a pivot joint, a support which is movably, in particular tiltably, attached to the pivot joint, at least one first bending frame member which has its longest dimension in a first direction, which is bendably adjustable angularly or crosswise to the first direction, which is attached with a first end to a first attachment means and which is attached with a second end to the support, and at least one second bending frame member which has its longest dimension in a second direction, which is angular or crosswise to the first direction, which is bendably adjustable angularly or crosswise to the second direction, which is attached with a first end to the first attachment means or to a further attachment means and which is attached with a second end to the support, whereby bending of the first bending member and/or the second bending member causes a movement of the support, a rear view device with such an adjustment unit and a vehicle with such an adjustment unit and/or such a rear view device are described in the U.S. patent application Ser. No. 15/153,106, filed on May 12, 2016, under the title ADJUSTMENT UNIT, REAR VIEW DEVICE AND VEHICLE and claiming the priority of European Patent Application No. 3 093 195 B1, filed on May 12, 2015, under the title ADJUSTMENT UNIT, REAR VIEW DEVICE AND VEHICLE, the contents of which are hereby incorporated by reference in this application. An adjustable rear-view device, in particular an exterior mirror, for a motor vehicle, which is provided with a mirror head, with a mirror base and with at least one articulation device arranged between mirror head and mirror base, which comprises at least one elastomeric element and an axis of rotation about which the mirror head is moved relative to the mirror base from a first functional position, in which the mirror head is held by the elastomeric element, to at least one second functional position, in which the elastomeric element is stretched or compressed, is movable, in particular rotatable or foldable, and is equipped with at least one electrical conductor means which is extended at least between the mirror base and the mirror head and through which electrical energy can be transported so that the at least one electrical conductor means is elastically deformable at least in the direction of its longitudinal extension, a method for producing such a rear-view device, and a motor vehicle with such a rear-view device is provided in the U.S. patent application Ser. No. 15/152,054, filed on May 11, 2016, under the title ADJUSTABLE REARVIEW DEVICE, METHOD AND MOTOR VEHICLE, claiming the priority of European Patent Application No. 15167444.7, filed on May 12, 2015, under the title ADJUSTABLE REARVIEW DEVICE, METHOD AND MOTOR VEHICLE, the contents of which are hereby incorporated by reference in this application. A slipping clutch for a motor vehicle exterior mirror adjusting device, comprising two plastic parts, a first part being formed as an outer gear with a first plurality of first clutch elements and the second part being formed as an inner shaft with a second plurality of second clutch elements, the two plastic parts rotating together up to a predetermined maximum torque, there is a positive fit between the first and second coupling elements up to the predetermined maximum torque and the first plastic part is made of a plastic material having a higher elasticity than the second plastic part, and an exterior mirror for a motor vehicle with an adjusting device comprising such a slip clutch, are contained in the U.S. patent application Ser. No. 15/252,708, filed on 31 Aug. 2016 under the title SLIDING CLUTCH FOR AN ADJUSTMENT DEVICE AND SIDE-VIEW MIRROR FOR A MOTOR VEHICLE HAVING AN ADJUSTMENT DEVICE, which claims the priority of European patent application No. 15183334.0 filed on Sep. 1, 2015, entitled "FRICTION CLUTCH FOR AN ADJUSTMENT DEVICE AND EXTERNAL REARVIEW MIRROR FOR A MOTOR VEHICLE WITH AN ADJUSTING DEVICE", the contents of which are hereby incorporated by reference in this application.

Furthermore, the camera system can also include cleaning elements to clean the optical element that faces outwards and is exposed to the environment. The cleaning element may contain, for example, wipers, brushes, lips, nozzles, fans and similar elements as described in European patent application No 14165197.6 filed on Apr. 17, 2014 under the title OPTICAL SYSTEM FOR A VEHICLE, CLEANING DEVICE AND VEHICLE WITH AN OPTICAL SYSTEM, U.S. patent application Ser. No. 15/281,780, German patent application No 102016108247.3, European patent application No. 13163677.1 filed on Apr. 15, 2013 under the title LENS WIPER, European patent application No. 15173201.3 filed on Jun. 22, 2015 under the title LENS CLEANING WITH FLEXIBLE ACTUATOR and European patent No. 1673260 filed on Oct. 14, 2003 for CLEANING DEVICE, the contents of which are hereby incorporated by reference into this application. The cleaning devices are not limited in their composition and may include, for example, any fabric, elastomer, sponge, brush or combination thereof. Special wiper elements comprising wiper arms, wiper blades, wiping cloths, wiping fabrics and combinations thereof are described in European Patent Application No. 14165197.6, to which reference is hereby made. For example, a wiper element may be controlled by the method described in European patent application No 130164250.6 filed on 18 Apr. 2013 under the title METHOD FOR CONTROLLING A WIPER DEVICE, the contents of which are hereby incorporated by reference in this application. A reservoir for holding a cleaning liquid is described in European patent application No. 14165197.6, the contents of which are incorporated by reference in this application. Such a reservoir may be attached to or integrated into the camera system to supply the cleaning fluid to the optical elements of the camera system.

Various methods can be used to detect dirt or other opacity that prevents or deteriorates the functioning of the camera system as defined in U.S. Pat. No. 8,395,514, filed on Jun. 24, 2008 under the title OPTICAL SYSTEM AND METHOD FOR THE RECOGNITION OF Opacity OF THE OPTICAL SYSTEM IN A VEHICLE, European Patent No. 1328141, filed on January 12 under the title ORDER OF A FLEXIBLE MATERIAL GUIDE AND METHOD FOR THE MANUFACTURE OF SUCH ASSEMBLY and U.S. Pat. No. 8,031,224, the contents of which are hereby incorporated by reference into this application.

Also, light sources may be incorporated or integrated into the camera system to increase the visibility of surrounding objects, measure distances and directions, and detect dirt, as described in U.S. Pat. No. 8,031,224, U.S. Patent Application No. 62/470,658, filed Mar. 13, 2017, 2016, under the title LIGHT-EMITTING MIRROR MOUNT and U.S. patent application Ser. No. 09/771,140, and their contents are hereby incorporated by reference into this application.

Various heating means, such as heating coils, heating devices integrated into the lens holder or mount, or other heating elements can be used to prevent condensation and icing on the surface of optical elements, as in the German patent application No 102016108247.3, U.S. Patent Application No. 62/470,658 and German Patent Application No. 102016107545.0, filed on Apr. 22, 2016, under the title HEATING DEVICE FOR A CAMERA LENS, the contents of which are hereby incorporated by reference into this application.

Waterproof seals against weathering as well as against the influence of washing processes with detergents, solvents and high-pressure cleaners can be used on the housing of the camera system, as for example described in the U.S. patent application Ser. No. 13/090,127 and the contents of which are included by reference in this application. An exterior rear view device for a motor vehicle and a sealing device for fluid-tightly closing an opening in a wall element of an exterior rear view device is disclosed in German Patent No. 10 2012 107 680 B3, filed on Aug. 21, 2012 under the title EXTERNAL REAR VIEW ASSEMBLY FOR A MOTOR VEHICLE AND SEALING DEVICE, the contents of which are hereby incorporated by reference into this application. A sealing device for a rear-view device, such as an interior or exterior mirror or camera, of a motor vehicle, which can be arranged between a foot part and a head part which can be rotated relative to the foot part from a basic position to at least one folded position, with at least one sealant, which can be fixed or is fixed to the foot part or to the head part and which can be or is arranged in a sealing arrangement in which it closes a gap existing between the foot part and the head part, resting against the foot part and the head part, and above which a rear view device with such a sealing device is provided in the U.S. patent application Ser. No. 15/314, 390, filed on 8 May 2015 under the title SEALING DEVICE, REAR-VIEW DEVICE, AND MOTOR VEHICLE, which claims the priority of European Patent No. 2 949 512 B1, filed on 27 May 2014 under the title SEALING DEVICE, REAR-VIEW DEVICE, AND MOTOR VEHICLE, the contents of which are hereby incorporated by reference into this application.

A rear view element folding device for a motor vehicle for moving to at least one rotational position of an element housing relative to an element foot which can be mounted on the motor vehicle and for locking or unlocking at least one rest position of the element housing relative to the element foot, and a method for actuating such a rear view element folding device, are described in U.S. patent application Ser. No. 15/349,657, filed on Nov. 11, 2016 under the title REAR VIEW ELEMENT FOLDING DEVICE and the European Patent Application No. 16197212.0, filed on Nov. 4, 2016 under the title REAR VIEW ELEMENT FOLDING DEVICE, both of which claim the priority of German utility model No. 20 2015 106 118.8, filed on Nov. 12, 2015 under the title RETURN ELEMENT CLICKING DEVICE, the contents of which are hereby incorporated by reference in this application.

In addition or alternatively, the housing may be made of a body consisting of plastic and conductive material, the conductive material being distributed in the plastic material to form a conductive mass to enable a power source, preferably a DC voltage source, to connect to the body via at least two electrodes and to heat the body accordingly, as described in German patent application No 102016107545.0, the contents of which are incorporated by reference in this application.

A conductive track may be embedded in plastic parts of the camera system as described in European Patent No 1328141 and U.S. Pat. No. 7,083,311, filed on 12 Jan. 2002 under the title ASSEMBLY HAVING A CONDUCTOR FROM FLEXIBLE MATERIAL AND METHOD FOR MANUFACTURING SUCH AN ASSEMBLY, the contents of which are hereby incorporated by reference into this application.

The camera system may comprise an energy collection system as described, for example, in European patent application No 09171683.7 filed on 29 Sep. 2009 under the title SELF SUB STAINING REAR VIEW MIRROR, the contents of which are hereby incorporated by reference into this application.

A fault detection system for electrical consumers, as described in U.S. Pat. No. 8,487,633, filed on Jan. 14, 2010 under the title FAULT DETECTION OF ELECTRIC CONSUMERS IN MOTOR VEHICLES, the contents of which are hereby incorporated by reference into this application, may be used to detect failure of the camera system.

Various types of fasteners may be used to attach the camera system to the vehicle or other components, such as the snap-on joint described in European patent No 2233360, filed on 27 Mar. 2009 under the title SNAP FIT CONNECTION IN A REAR VIEW MIRROR, the contents of which are hereby incorporated by reference into this application.

Various control means and analysis devices can be used, such as the calculation units contained in the U.S. patent application Ser. No. 13/090,127, the German patent application No. 102016106126.3, the German patent application No. 102011053999, the European patent specification No. 2146325, on Jul. 16, 2008 under the title RECORDING DEVICE FOR RECEIVING, PROCESSING AND STORING IMAGE FILES IN A VEHICLE AND METHOD, and U.S. Pat. No. 8,849,104, filed on Jul. 16, 2008. under the title RECORDING DEVICE FOR RECORDING, EDITING AND STORAGE OF IMAGE DATA IN A VEHICLE AND PROCESSES, the contents of which are hereby incorporated by reference into this application. In addition, HDR (High Dynamic Range) technology may be used according to U.S. patent application Ser. No. 14/830,406, filed on Aug. 19, 2015 under the title REVIEW DEVICE FOR A MOTOR VEHICLE, the contents of which are hereby incorporated by reference into this application. A method of processing input image data by an image processing device to achieve a desired visual effect within the output image, wherein input image data is stored in an input memory device and the input image data is transferred into respective output image data stored in an output memory device based on data of a look-up table, the look-up table being generated based on at least one data re-mapping function, is provided in the U.S. patent application Ser. No. 14/891,548, filed on May 13, 2014, under the title METHOD AND DEVICE FOR PROCESSING INPUT IMAGE DATA, claiming the priority of European Patent Application No. 13168085.2, filed on May 16, 2013, under the title METHOD AND DEVICE FOR PROCESSING INPUT IMAGE DATA, the contents of which are hereby incorporated by reference into this application.

Additional functional elements or decorative elements such as logo projectors are therefore increasingly being integrated into rear view devices on motor vehicles. Such a logo projector can be used to project a symbol, for example a manufacturer's logo, onto the road. For this purpose, the logo projector comprises a light source, a mask or slide for fixing the logo, and a projection lens. To ensure that the logo can be projected onto the road without distortion, the position of the logo projector must be precisely defined. However, since there are usually other tolerances in addition to the logo projector's internal tolerance, i.e. the relative position between mask and optics, for example between the logo projector and mirror housing, between mirror head and mirror foot, and between mirror foot and body, the position of the logo projector is not always exactly defined. This can lead to unwanted angular deviations or distortion of the projected logo.

U.S. Pat. No. 7,600,905 B2 reveals a light unit with two light guide sections that are located in one surface and a third light guide section that runs outside or below the surface. The surface is similar to the housing of an exterior mirror, for example, in which the light unit can be inserted. The light guide sections extend from the first ends to a second end in the form of a joint. In the transition, all light guide sections are connected to each other and form a decoupling area from which light from lamps can be decoupled, the light of which is coupled at each of the first ends in a front area of the respective light guide section. The lamps, which are preferably designed as LEDs, can be arranged on a common, flat printed circuit board which is arranged parallel, perpendicular or inclined to the end face. The lamps can be arranged upright, horizontally or inclined on the printed circuit board. The lamps can protrude into the respective front areas via coupling devices or, without additional coupling devices, shine directly in the direction of their optical axis into the respective front areas.

US 2016/0209000 A1 describes a light guide device for an lighting device, in particular for a motor vehicle or a display device in a rear view device of a motor vehicle. It comprises a light coupling side for coupling light from a light source; a reflecting side with a reflective layer; and a light outcoupling side disposed generally opposite the reflection side, wherein a distance between the reflection side and the light outcoupling side generally decreases with increasing distance from the light outcoupling side, and the reflection side is configured with the reflection side so that light coming from the light outcoupling side is deflected to the light outcoupling side, and the reflection layer is an ink or lacquer layer printed or vapor deposited on the reflection side. The light guide device can be used in conjunction with, for example, three light sources and has a reflection side and a reflection layer with three funnels. The longitudinal axis of these funnels extends along the main direction of the coupled light.

A display device for a motor vehicle configured to be placed in a rear view device, such as an interior or exterior mirror, is known from the USA 2017/0090100. It comprises at least one light source and at least one optical unit. The optical unit comprises at least one light-guiding body comprising at least one coupling section through which light emitted from at least one light source can be coupled into the light-guiding body; and at least one coupling section through which light can be coupled out of the light-guiding body. At least one optical means is provided which is or can be attached to the light-transmitting body at least in some sections so as to be superimposed on the surface of the at least one outcoupling section of the light-transmitting body. Also provided is at least one optical element with which a beam path of at least the light passing through the at least one optical element can be deflected and/or divided into scattered light bundles, wherein the at least one optical means comprises a plurality of optical elements of the at least one optical element which, when they are at the same distance or at a different distance from the coupling section of the light-guiding body, correspond in their refractive or reflective behaviour and differ in the opposite case. The at least one optical element has an n-angular, arrow-shaped, curved or arc-shaped cross-section or a pyramid-shaped, dome-shaped or elliptical contour. The cross-section of the at least one optical element increases or decreases with increasing distance from the coupling section. The at least one outcoupling section of the light-transmitting body comprises a plurality of outcoupling regions which are arranged in a stepwise or sawtoothlike offset relationship to one another and on which one of the at least one optical elements is arranged.

SUMMARY

The task of the present invention is the further development of the known lighting device, in particular to homogeneously illuminate an area adjacent to the vehicle, in particular a relatively large area on the road surface of the vehicle. Thereby, a particularly low-distortion projection of a logo, a symbol, a message or the like on the road surface should be possible.

According to the invention, this task is solved by assigning a light funnel to each light emitter while determining an optical axis A, and each optical axis A has an angle α of up to about 40° with respect to a plane, said plane being selected from a horizontal plane, the plane with the road surface of the motor vehicle, a vertical plane extending substantially perpendicular to the body part to which the rear view device is attached and/or a plane B comprising the underside of the light guide, for bundling, in particular focusing, the light coupled out of each light funnel at a light window of the light transmission unit It may be provided that there are two or more light emitters and two or more light funnels, whereby all optical axes crossing on the light outcoupling side of the light funnels.

It is again suggested that the light funnels are connected to one another and/or formed in one piece by means of a web, and/or the light funnels are connected to the light source, in particular a printed circuit board of the light source, and/or the light transmission unit, in particular the light window, and/or the light funnel(s) or the web is/are attached via a support and/or adjusting device, in particular comprising clips, hot staking, laser staking or welding.

The invention may also provide that the angle α is adjustable via the support and/or adjusting device and/or between the optical axis A and the plane B of the light guide up to about 40°, preferably about 35°, and/or the plane B of the light guide comprises the lower surface of the web facing the road surface and/or the printed circuit board is arranged perpendicular to the optical axis (A) of the light emitter(s).

Also provided according to the invention is that each light funnel is provided with an ellipsoid and/or paraboloidal surface geometry at least in one segment, preferably opposite the web, and/or each light funnel has a light incoupling end on the side of the light source, preferably at the same distance or at a different distance from the printed circuit board, and/or each light funnel has a light outcoupling end on the side of the light transmission unit, preferably at the same distance or at a different distance from the light window.

It may be provided that the cross-section of each light funnel decreases with increasing distance from its respective light incoupling end, and/or the web extends from the light incoupling ends to the light incoupling ends, and/or the light emitting ends are arranged substantially along a ring surface or tangentially to a ring surface.

The invention also suggests that at least one, preferably each, of the light funnels is provided with at least one optical means, preferably comprising a plurality of optical elements and/or at least one lens.

It may be provided that the optical means provides a two-layer optic, in particular with a first cushion or step structure, which runs along the optical axis A of the respective light funnel, and in particular with a second cushion or step structure within the first cushion or step structure, which is arranged along the optical axis A, and/or the optical elements are provided with an n-angular, arrow-shaped, curved or circular-arc-shaped cross-section or a pyramid-shaped, dome-shaped or elliptical contour, and/or the lens is provided at the end of the light outcoupling.

Furthermore, it may be provided that the light transmission unit is designed as a 2-component unit, in particular as a 2-component injection mould, and/or the light transmission unit has the light window, a housing, in particular provided by or with a cover, at least one aperture, at least one reinforcing and/or cooling rib and/or at least one holder for the light guide and/or for the light source, which is in particular enclosed by the support and/or adjusting device.

In accordance with the invention, it is again suggested that the housing provides the at least one aperture, the at least one reinforcing and/or cooling rib and/or the at least one mounting, preferably the at least one reinforcing and/or cooling rib and the at least one mounting being fromed together, and/or the light transmission unit, in particular the housing, being made of a material with high thermal conductivity.

It may also be provided that at least one plug for the light source is provided on the printed circuit board, preferably the plug as such or sealed by moulding or welding, and/or at least one cable is suitable for connection, in particular to the at least one plug, preferably the cable passing through the light transmission unit, in particular the housing.

According to the invention, it is preferred that the light guide is asymmetrical and/or comprises 3 light funnels, and/or the light window comprises at least one lens or is formed as a lens.

Furthermore, it may be provided that each light funnel extends upward or downward from its light incoupling end to its light outcoupling end, and/or each light incoupling end lies within a first plane extending substantially parallel to the surface of the respective LED, and/or each light outcoupling end lies within a second plane which extends and/or is inclined substantially perpendicular to the inner and/or outer surface of the light window, preferably at an angle of between 30 and 40°, preferably 35°, with respect to the optical axis A of the respective LED.

It may also be provided that the circuit board of the light source is rotated between 10 and 25°, preferably 18°, about the x-axis of the vehicle coordinate system and/or up to 10°, preferably 4°, about the y-axis of the vehicle coordinate system and/or up to 10°, preferably 5°, about the z-axis of the vehicle coordinate system and/or the light window is rotated up to 25°, preferably 10°, about the x-axis of the vehicle coordinate system, the x-y plane is parallel to the horizontal plane and/or the y-z plane is parallel to the vertical plane.

It is suggested that the circuit board has a rectangular shape and runs parallel to the x-z plane, preferably the longer edge of the rectangular shape runs parallel to the x-y plane, wherein preferably the light emitters are arranged along a line, which is parallel to the longer edge of the printed circuit board.

It may also be provided that the light guide, the light funnel, the light transmission unit or the light window is/are formed from plastic, in particular from PMMA.

Inventive lighting devices can also be characterized by a projector module for projecting a logo, symbol, message or warning onto the road surface, and/or an adjusting device, in particular provided by the support and/or adjusting device and/or for spatial adjustment of the projector module.

It may be provided that the adjusting device comprises at least one first adjusting element arranged on the projector module or formed with a projector module housing, and/or the adjusting device has at least one translatory degree of freedom along at least one displacement axis and/or at least one rotational degree of freedom about at least one axis of rotation.

A further development in accordance with the invention can also be characterized by an surrounding light, which is preferably integrated into the projector module, and/or a maneuvering light, which is preferably connectable to the projector module and/or provided in one unit with the projector module and/or formed as a module, which in particular comprises the printed circuit board with the light source, the light guide associated with the light source and the housing, preferably made of acrylonitrile-butadiene-styrene copolymer (ABS) and/or aluminum.

The invention further relates to a rear view device, in particular in the form of an exterior rear view mirror, a camera pod or a combination thereof, for a motor vehicle, comprising a rear view device housing and an lighting device according to the invention which can be arranged therein.

It may be provided that the lighting device illuminates an area adjacent to the motor vehicle, in particular the road surface of the motor vehicle, and/or provides a surrounding light, a proximity light, a maneuvering light, a puddle light, a logo light in which preferably the aperture comprises a mask in the shape of the logo, and/or a projector module.

In addition, it is proposed that the support and/or adjusting device for adjusting a relative position of the projector module to the rear view device housing and/or motor vehicle is provided and/or can be operated manually, preferably from outside the rear view device, and/or automatically, preferably by means of a robot arm.

It may again be provided that the support and/or adjusting device comprises a guide means, at least one latching element, an adjusting screw and/or a fixing screw, and/or the retaining and/or adjusting device comprises at least one second adjusting element which is arranged on a retaining part for the projector module and/or the rear-view device housing, in particular in the form of a mirror head shell and/or a mirror foot cover support and/or adjusting, and/or the support and/or adjusting device comprises at least one fixing element for fixing the projector module in a position adjusted by means of the adjusting device, preferably in the form of the fixing screw and/or an adhesive.

The invention also suggests that the surrounding light and/or the maneuvering light is/are movable with the projector module.

It may also be provided that the maneuvering light is arranged on a window area of the housing, preferably the window area comprising at least one first colour-transparent subarea and at least one second opaque subarea.

Finally, the invention also includes a motor vehicle with an inventive lighting device and/or a rear view device.

In a preferred embodiment, the lighting device for a rear-view device of a motor vehicle according to the invention is equipped with a projector module which can be spatially adjusted via an adjusting device for projecting a logo, a symbol, a message or a warning onto a road surface, wherein the adjusting device comprises at least a first adjusting element which is arranged on the projector module or is formed with a projector module housing.

It may be provided that the adjusting device has at least one translatory degree of freedom along at least one displacement axis and/or at least one rotational degree of freedom about at least one axis of rotation.

In addition, the projector module may include at least one further lamp, in particular in the form of an surrounding light, preferably the surrounding light being integrated into the projector module.

There may also be at least one maneuvering light, preferably connectable to the projector module and/or provided with the projector module in one unit.

It is suggested that the maneuvering light is formed as a module, which in particular comprises a printed circuit board with at least one illuminant, at least one light guide associated with the at least one illuminant and a housing, in particular made of acrylonitrile-butadiene-styrene copolymer (ABS) and/or aluminum.

A rear-view device for a motor vehicle can, according to the invention, be provided with a housing and a lighting device which can be arranged in the housing and is in accordance with the invention, wherein the adjusting device is provided for adjusting a relative position of the projector module to the mirror housing and/or motor vehicle.

It may be provided that the adjusting device can be operated manually, preferably from outside the rear-view device, and/or automatically, preferably by means of a robot arm.

It is further proposed that the adjusting device includes a splitter guide, at least one detent element, an adjusting screw and/or a fixing screw.

Preferably, the adjusting device comprises at least one second adjusting element, which is arranged on a retaining part for the projector module and/or the housing, in particular in the form of a mirror head shell and/or a mirror base cover, or is formed with the same.

It is also proposed that the adjusting device should include at least one locking element for locking the projector module in a position adjusted by means of the adjusting device, preferably in the form of the fixing screw and/or an adhesive.

In addition, it is preferably intended that the surrounding light can be moved with the projector module.

According to the invention, the maneuvering light can be arranged at a window area of the housing, preferably the window area comprising at least one first colour-transparent subarea and at least one second opaque subarea.

A rear-view device according to the invention, for example in the form of an exterior rear-view mirror, thus comprises a mirror housing and a projector module arranged in the mirror housing for projecting in particular a logo onto a road surface, a relative position of the projector module to the mirror housing being adjustable by means of at least one adjusting device. This makes it possible to compensate for positional deviations of the projector module which may occur due to the tolerance chain between the projector module, mirror housing and the motor vehicle itself, so that a distortion-free and visually appealing projection can be reliably achieved. The relative position can be adjusted manually, for example, under visual control of the projected logo, for which purpose a reference mask placed on the projection surface can also be used. Automated adjustment, for example using a robot, is also possible. Such an automated adjustment process can be carried out iteratively under camera control, for example.

In a preferred embodiment of the invention, the at least one adjusting device has at least one translatory degree of freedom along at least one axis of displacement and/or at least one rotational degree of freedom about at least one axis of rotation. By translational adjustment, positional deviations can be corrected, for example, while rotational adjustment enables the correction of angular deviations. However, depending on the choice of the translatory degree of freedom, angular deviations can also be corrected.

In another preferred embodiment of the invention, the at least one adjusting device comprises a guide means. This is an adjustment possibility which is particularly easy to realize mechanically, but which nevertheless allows complex adjustments, depending on the choice of the baffle geometry.

In another preferred embodiment of the invention, the at least one adjusting device comprises at least one detent element. By means of the at least one detent element the projector module can be pre-fixed in predetermined adjustment positions. This ensures that the adjustment of the position of the projector module is not lost even before the projector module is finally fixed.

In another preferred embodiment of the invention, the at least one adjusting device comprises at least one adjusting screw. Such an adjusting screw enables a particularly simple and quick adjustment of the position of the projector module. By the power transmission of the screw, a particularly fine adjustment can be realized at the same time. The adjusting screw can also be combined with other adjusting elements and can, for example, drive the movement of the projector module along a guide means or its rotation around a rotation axis.

In another preferred embodiment of the invention, at least a first adjusting element of the at least one adjusting device is arranged on the projector module. The at least one first adjusting element thus couples the projector module to the adjusting device so that its movements are transmitted to the projector module and the adjustment is made possible.

In another preferred embodiment of the invention, at least one second adjusting element of the at least one adjusting device is arranged on a retaining part for the projector module and/or a mirror head shell and/or a mirror base cover. The at least one second adjusting element thus couples the adjusting device to a further component so that the desired relative movement to this component and thus to the rear view device as a whole is made possible.

In another preferred embodiment of the invention, at least one locking element is provided for locking the projector module in a position set by means of the adjusting device. By means of the at least one locking element, the projector module can be finally fixed after adjustment, so that the desired adjustment is reliably maintained.

In another preferred embodiment of the invention, the at least one locking element is a screw and/or an adhesive. Thus, a releasable or a final fixation of the projector module can be achieved depending on the requirements.

In another preferred embodiment of the invention, the projector module includes an surrounding light. This can provide additional surrounding lighting for the motor vehicle, e.g. in the form of a puddle light, in order to make it easier to get in and out of the vehicle. By integrating the surrounding light into the projector module, the functionality of the projector module is increased.

In the case of another preferred embodiment of the invention, the rear-view device also includes at least one maneuvering light. This can provide additional surrounding lighting for the motor vehicle and thus increase driving safety. The integration of the maneuvering light into the rear view device also makes particularly good use of the available installation space.

In another preferred embodiment of the invention, the at least one maneuvering light is located at a window area of the mirror housing. The maneuvering light is thus arranged inside the mirror housing and protected from environmental influences. The lighting is provided through the window area so that the outer geometry of the mirror housing is not affected.

In another preferred embodiment of the invention, the window area comprises a first colour-transparent part and a second opaque part. In this way the radiation geometry of the maneuvering light can be adjusted as desired and at the same time a visually appealing colouring of the radiated light can be realized.

In another preferred embodiment of the invention, the maneuvering light is designed as a module comprising a printed circuit board with at least one illuminant, at least one light guide associated with the at least one illuminant and a housing, in particular made of acrylonitrile-butadiene-styrene copolymer (ABS) and/or aluminum. The modular form allows pre-assembly of the said components, so that the final assembly of the maneuvering light in the mirror housing can be carried out particularly easily and quickly.

The invention further relates to a motor vehicle with a lighting device and/or a rear view device according to the invention. The above-mentioned advantages also apply here.

BRIEF DESCRIPTION OF THE DRAWINGS

In the following, the invention and exemplary embodiments of the same are explained in detail by means of a schematic drawing. Thereby shows:

FIG. 7 is a top view in perspective of a fourth lighting device according to the invention;

FIG. 8 is a further perspective top view of the lighting device according to FIG. 7;

FIG. 9 is a perspective side view of the illuminating device as shown in FIG. 7 without light source;

FIG. 10 is another perspective side view of the illuminating device as shown in FIG. 7, showing the light beam focused by means of light funnels;

FIG. 11 is a further perspective side view of the illuminating device as shown in FIG. 7, showing the connection of the light source; and FIG. 12 is a side view of the lighting device as shown in FIG. 7, showing the inclination of the light guides in particular.

DETAILED DESCRIPTION

Figure 1:
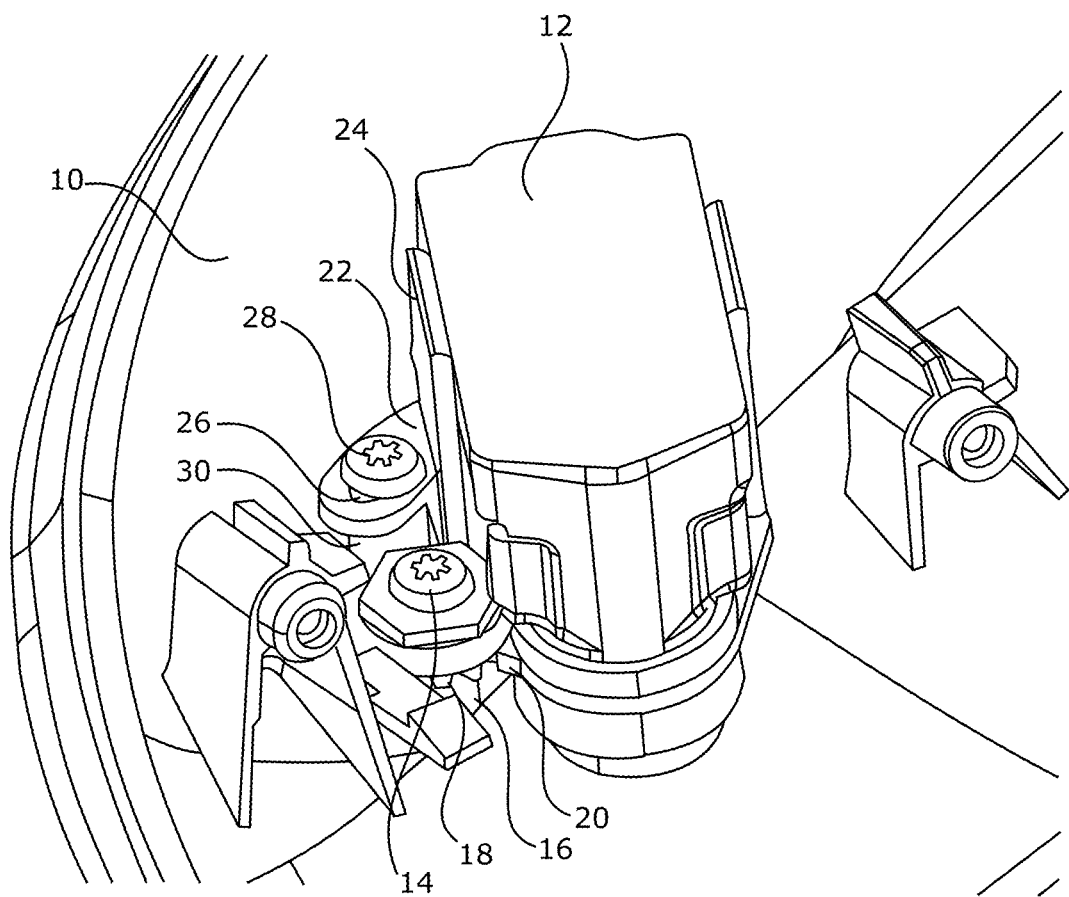
FIG. 1 is a perspective view from the inside of a mirror head shell of a rear view device of the invention with a first lighting device of the invention comprising a projector module.

In a first type of a rear view device of the invention with a mirror head movably mounted on a mirror base not shown, as shown in FIG. 1, a projector module 12 for projecting a logo onto a road surface is mounted on an inner side of a mirror head shell 10. The mirror head shell 10 forms part of the outer coating of the mirror head of the rear-view device and, when mounted on a vehicle, is directed forward in the direction of the longitudinal axis of the vehicle. The projector module 12 represents a first lighting device in accordance with the invention, whereby the projector module 12 and further components of the rear view device are either mounted directly on the mirror head shell 10 or indirectly connected to it via retaining elements. In the example shown in FIG. 1 the mounting is carried out directly on the mirror head shell 10.

In order to be able to correct tolerance related position deviations of the projector module 12, an adjusting screw 14 is provided, which is accommodated in a screw dome 16 of the mirror head shell 12. The adjusting screw 14 is provided with detent elements 18 which engage in complementary detent elements 20 of the projector module 12.

By actuating the adjusting screw 14, the projector module 12 can thus be swiveled so that its relative position to the mirror head shell 10 can be corrected. The movement of the projector module 12 is controlled by a guide means 22, which is formed on a housing 24 of the projector module 12 and comprises a curved elongated hole 26. A fixing screw 28, which is accommodated in a screw dome 30 of the mirror head shell 10, is guided through the elongated hole 26. As soon as the projector module 12 is moved to its target position by actuating the adjusting screw 14, it can be fixed in this position by tightening the fixing screw 28.

Figure 2:
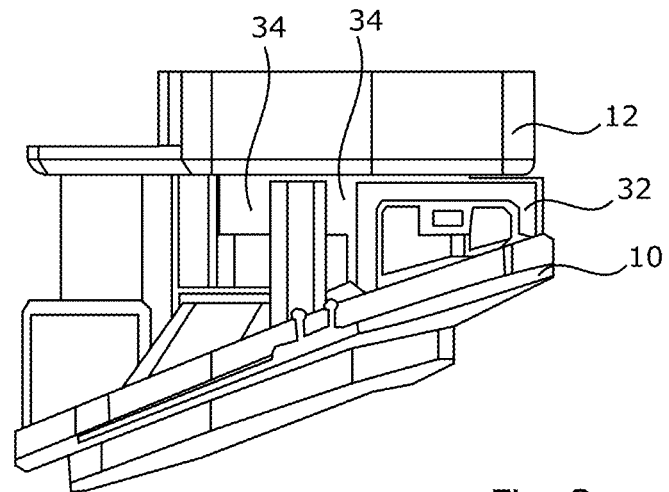
FIG. 2 is a sectional view of a mirror head shell with a second lighting device of the invention comprising a projector module.

An alternative design is shown in FIG. 2 in cross-section. The projector module 12, which represents a second lighting device according to the invention, is there indirectly connected to the mirror head shell 10 via a support device 32. Here, too, adjustment elements 34 are provided by means of which the relative position of the projector module 12 to the mirror head shell 10 can be adjusted.

Figure 3:
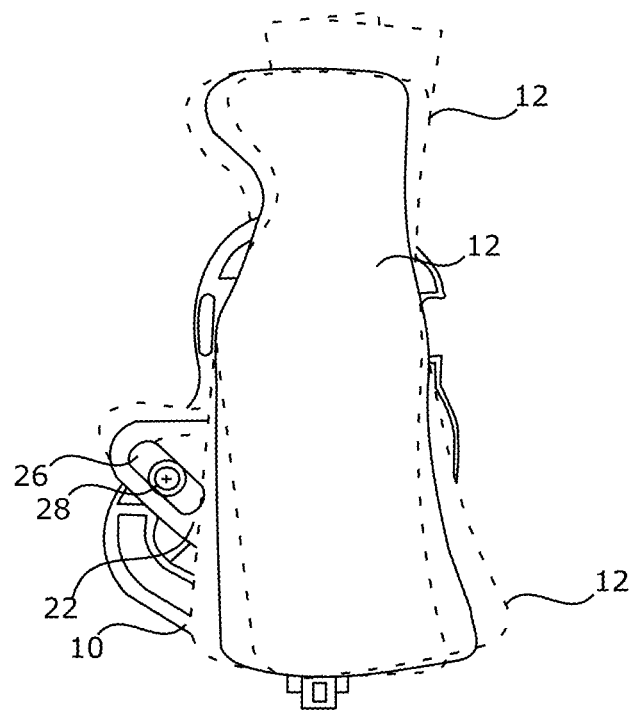
FIG. 3 is a top view of the projector module of FIG. 1, in various adjustment positions.

FIG. 3 shows a top view of the pivoting of the projector module 12 of FIG. 1, guided by the guide means 22. The maximum pivoting angle in the example shown is about +/−6° around a center position of the projector module 12, limited by the stops of the elongated hole 26. The dotted outlines show the end positions of the projector module 12.

Figure 4:
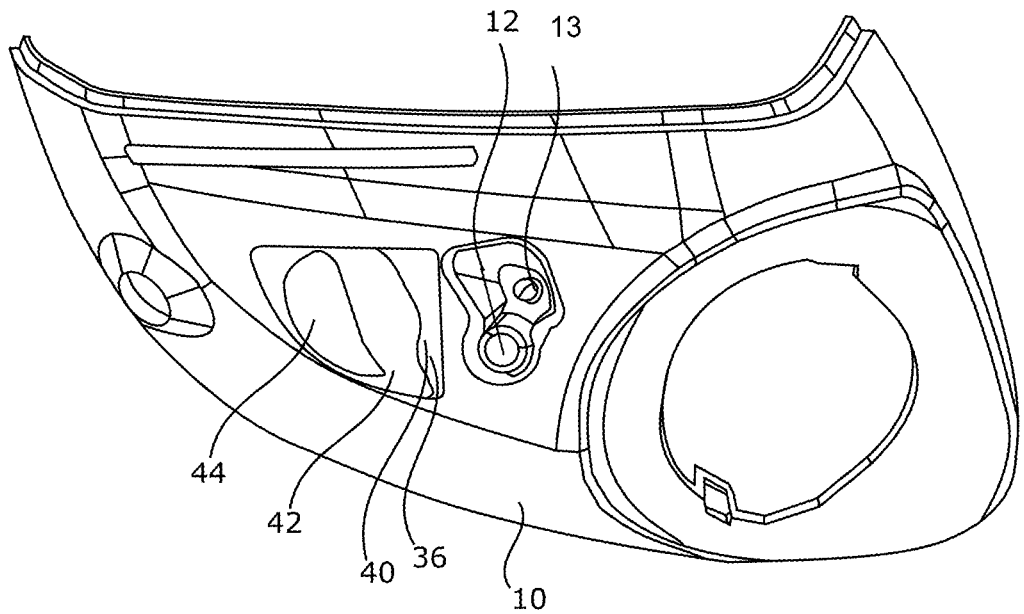
FIG. 4 is a perspective view of a mirror head shell with a third inventive lighting device comprising a projection module with integrated surrounding light and a maneuvering light module, from the outside.
Figure 5:
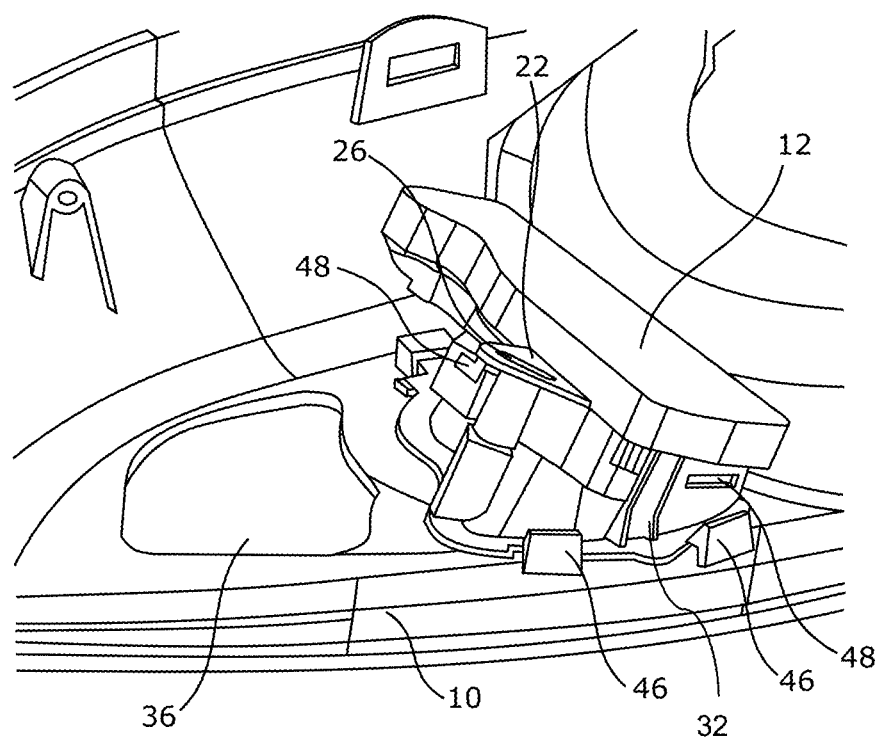
FIG. 5 is a detailed view of the mirror head shell according to FIG. 4 with mounted projector module with integrated surrounding light, from the inside.
Figure 6:
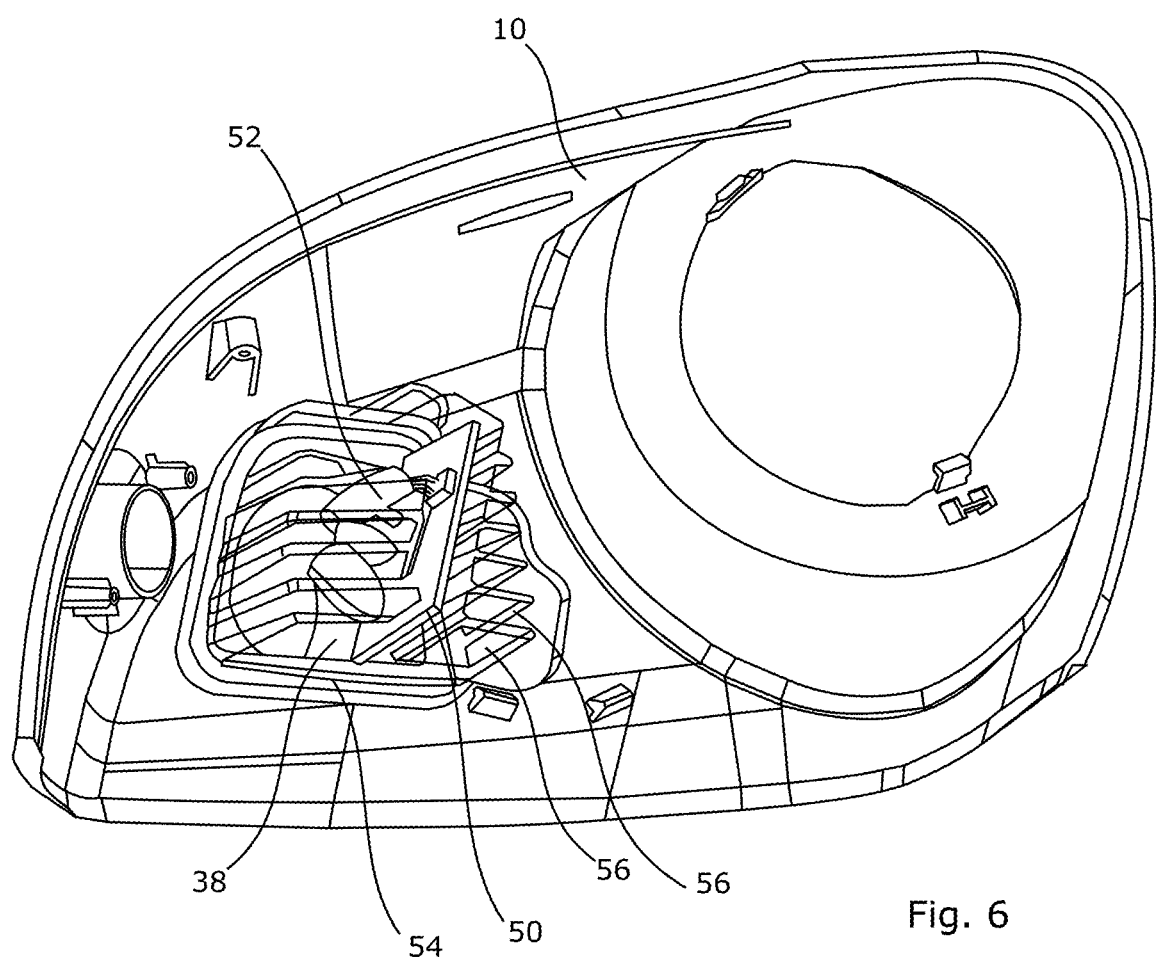
FIG. 6 is a detailed view of the mirror head shell according to FIG. 4 with an additionally mounted maneuvering light module, from the inside.

A further version of a rear view device according to the invention is shown in FIGS. 4 to 6. Here, FIG. 4 shows an exterior view of a mirror head shell 10 which, on the one hand, carries a third inventive lighting device in the form of a projector module 12 with an integrated surrounding light 13 and, on the other hand, in addition to the projector module 12, a window 36 is provided for a maneuvering light 38 which also belongs to the third inventive lighting device and is shown in FIG. 6. The maneuvering light 38 projects light through the window 36, the beam range being determined by a plastic aperture 40. This has an opaque subarea 42, for example of polycarbonate, and a colour-transparent subarea 44, for example of blue-coloured polymethyl methacrylate.

FIG. 5 shows the mirror head shell 10 of FIG. 4, but from the inside. The projector module 12 with integrated surrounding light 13 is attached to the mirror head shell 10 by means of a support device 32. The bracket 32 is in turn held to the mirror head shell 10 with clip connectors 46. Further clip connectors 48 fix the projector module 12 to the bracket 32. Again, the elongated hole guide 22 for adjusting the position of the projector module 12 is visible.

In the illustration in FIG. 6, the maneuvering light 38 is shown as a module and in its assembled state. The module comprises a printed circuit board 50 with light elements that emit light towards the window 36 via a light guide 52. The maneuvering light 38 is accommodated in a two-component housing 54, which is made of transparent acrylonitrile-butadiene-styrene copolymer towards the window 36 and has cooling ribs 56 made of aluminum for heat dissipation. By means of the maneuvering light 38, surrounding lighting is possible, in addition to the puddle light of the surrounding light 13 and the logo of the logo projector 12.

All in all, this creates a rear view device that allows the exact position of a projector module 12 to be adjusted so that it can provide a distortion-free projection of a logo onto the road. At the same time, other lighting variants are connected to the projector module 12 or even integrated there. This increases the range of applications with minimal installation space.

The construction of the maneuvering lamp 38, in particular details of its light guide 52, is analogous to that of the fourth lighting device of the invention, which is described with reference to FIGS. 7 to 12.

More precisely, FIGS. 7 to 12 represent an lighting device 101 of the invention comprising a light source 110, a light guide 120 and a light transmission unit 130. The light source 110 is provided by three light emitters in the form of LEDs 111, 112, 113 which are mounted on a printed circuit board 114 provided with a connector 115. The light guide 120 consists of three light funnels 121, 122, 123 each having a light incoupling end 121a, 122a, 123a arranged next to the light source 110 and a light outcoupling end 121b, 122b, 123b arranged next to the light transmission unit 130, the three light funnels 121, 122, 123 being connected by a substantially flat web 124. The light transmission unit 130 comprises a light window 131, a housing 132, fastening means 133 for the light source 110 and reinforcing ribs 134.

As can best be seen from FIGS. 7 and 8, the light incoupling ends 121a, 122a, 123a are flat and essentially parallel to the circuit board 114, while the light outcoupling ends 121b, 122b, 123b are flat and arranged horizontally to a ring surface. The web 124 extends from the light incoupling ends 121a, 122a, 123a to the light outcoupling ends 121b, 2112b, 23b, which are connected to each other only by the web 124, as best seen in FIGS. 8 and 9.

The light transmission unit 130 is designed as a 2-component component, namely in the form of an injection moulded part, whereby the housing 132 fulfills a variety of functions in addition to supporting and protecting the light source 110 and the light guide 120 within a non-illustrated rear view device of a vehicle, including attachment to the rear view device. The housing 132 also acts as a aperture defining an illuminated area adjacent to the vehicle. It is further provided with reinforcing ribs 134, in particular with edges, and fastening means 133 for the light source 110 and the light guide 120. In addition, the housing 132 ensures high heat dissipation from the light source 110 by being made of a material with high thermal conductivity.

Each of the LEDs 111, 112, 113 is assigned to one of the cones 1121, 22, 123 in a one-to-one connection, so that the light emitted by the LEDs 111, 112, 113 is guided within the light funnels 121, 122, 123 in order to be bundled in the area of the light window 131 acting as a lens and thus to provide homogeneous illumination of the area next to the vehicle. For this purpose, the optical axis provided by each light beam emitted by the LEDs 111, 112, 113 is inclined to the horizontal plane. As can be seen in FIG. 12, the optical axis A of the light emitted by the LED 111 for entering the light funnel 121 at the light incoupling end 121a, to be guided by the light funnel 121 and to exit from it at the light outcoupling end 121b, has an angle α with respect to the plane B comprising the underside of the light guide 120, which in turn is defined by the underside of the web 124. According to the invention, the angle α is less than 40°, preferably 35°. Furthermore, the angle between the optical axis A and the road surface is also less than 40°. The same applies to the optical axes of the other LEDs 112, 113, where all these optical axes cross at a single point.

Each of FIGS. 6 to 12 also shows the vehicle coordinate system relative to which PCB 114 is tilted. PCB 114 is actually rotated between 10 and 25° about the x-axis, up to 10° about the y-axis and up to 10° about the z-axis. Furthermore, the light window 132 is rotated up to 25° about the x-axis. These special inclinations enable a particularly high and homogeneous illumination of the area next to the vehicle to be illuminated, especially when the lighting device 101 is used as a maneuvering light.

When the fourth lighting device according to the invention is used as a logo lamp, the aperture of the light transmission unit 130 provides a logo shape and thus functions as a mask.

The features of the invention disclosed in the foregoing description, drawings and claims may be essential, either individually or in any combination, for the realization of the invention in its various embodiments.

LIST OF REFERENCE SIGNS

10 Mirror head shell
12 Projector module
13 Surrounding light
14 Adjusting screw
16 Screw dome
18 detent element
20 detent element
22 guide means
24 Housing
26 Elongated hole
28 Fixing screw
30 Screw dome
32 Support device
34 Adjusting element
36 Window
38 Maneuvering light
40 Plastic aperture
42 Opaque subarea
44 colour transparent subarea
46 Clip connector
48 Clip connector
50 Printed circuit board
52 Light guide
54 Housing
56 Cooling ribs
101 Lighting device
110 Light source
111, 112, 113 LEDs
114 Printed circuit board
115 Connector
120 Light guides 121, 122, 123 Light well
121a, 122a, 123a, 123a slight coupling in the end
121b, 122b, 123b Light emitting end
124 stays
130 light transmission units
131 Light window
132 Housing
133 Assembly materials
134 Pressure rib
A Optical axis
B Plane, comprising the underside of the light guide
x, y, z Coordinate system of the vehicle
α Angle

What is claimed is:

1. A lighting device of a rear view device of a motor vehicle, comprising:
   at least one light source with at least one light emitter for emitting light which can be coupled into and out of a light guide with at least one light funnel in order to pass at least through part of a light transmission unit and illuminate an area adjacent to the motor vehicle,
   wherein each light funnel extends upward or downward from a light input end to a light output end,
   each light emitter is associated with a light funnel determining an optical axis,
   each light input end lies within a first plane which is substantially parallel to the surface of a respective LED,
   each light output end lies within a second plane which extends substantially perpendicularly to an inner and/or outer surface of a light window and/or is inclined relative to the optical axis of the respective LED, and
   each optical axis has an angle of up to about 40° with respect to a third plane, the third plane being selected from a plane with a road surface of the motor vehicle, and a plane comprising an underside of the light guide for bundling the light coupled out of each light funnel at the light window.

2. The lighting device according to claim 1, wherein there are two or more light emitters and two or more light funnels, whereby all optical axes cross on the light output end of the light funnels.

3. The lighting device according to claim 1, wherein at least one of:
   the light transmission unit is designed as a two-component unit, or
   the light transmission unit has the light window, a housing at least one aperture, at least one reinforcing and/or cooling rib and/or at least one holder for the light guide and/or for the light source.

4. The lighting device according to claim 3, wherein at least one of:
   the housing provides the at least one aperture, the at least one reinforcing and/or cooling rib and/or the at least one mounting, or
   the housing is made of a material with high thermal conductivity.

5. A rear view device or an exterior rear view mirror, a camera pod or a combination thereof, for a motor vehicle, comprising:
   a rear view device housing and a lighting device of claim 1 which can be arranged therein.

6. A motor vehicle, comprising
   the rear-view device according to claim 1.

7. A lighting device of a rear view device of a motor vehicle, comprising:
   at least one light source with at least one light emitter for emitting light which can be coupled into and out of a light guide with at least one light funnel in order to pass at least through a part of a light transmission unit and illuminate an area adjacent to the motor vehicle of a road surface of the motor vehicle,
   wherein each light emitter is associated with a light funnel for bundling the light coupled out of each light funnel at a light window of the light transmission unit, determining an optical axis,
   each optical axis has an angle α of up to about 40° with respect to a plane with a road surface of the motor vehicle, and
   there are two or more light emitters and two or more light funnels, with all optical axes intersecting on a light output end of the light funnels.

8. The lighting device according to claim 7, wherein
   the light funnels are connected to one another and/or formed in one piece by means of a web,
   the light funnels are connected to the at least one light source, and the light transmission unit, or
   the light funnels or the web is/are attached via a support and/or adjusting device.

9. The lighting device according to claim 8, wherein at least one of:
   an angle α is adjustable via the support and/or adjusting device and/or between the optical axis and a plane of the light guide up to about 40°,
   the plane of the light guide comprises a lower surface of the web facing the road surface, or
   a printed circuit board is arranged perpendicular to the optical axis of the light emitter.

10. The lighting device according to claim 7, wherein at least one of:
    each light funnel is provided with an ellipsoid and/or paraboloidal surface geometry at least in one segment,
    each light funnel has a light incoupling end on a side of the light source, or
    each light funnel has a light outcoupling end on a side of the light transmission unit.

11. The lighting device according to claim 10, wherein at least one of:
    a cross-section of each light funnel decreases with increasing distance from its respective light incoupling end,
    the web extends from the light incoupling ends to the light outcoupling ends, or
    the light emitting ends are arranged substantially along a ring surface or tangentially to a ring surface.

12. The lighting device according to claim 7, wherein at least one of the light funnels is provided with at least one optical means.

13. The lighting device according to claim 12, wherein at least one of:
    the optical means provides a two-layer optical system, which runs along the optical axis (A) of a respective light funnel;
    the optical elements are provided with an n-angular, arrow-shaped, curved or circular-arc-shaped cross-section or a pyramid-shaped, dome-shaped or elliptical contour, or
    a lens is provided at the end of the light outcoupling.

14. The lighting device according to claim 7, further comprising:
    at least one plug for the light source is provided on the circuit board; and at least one cable is suitable for connection to the at least one plug.

15. The lighting device according to claim 7, wherein at least one of:
    the light guide is asymmetrical and/or comprises 3 light funnels; or
    the light window comprises at least one lens or is formed as a lens.

16. The lighting device according to claim 7, wherein at least one of:
    the circuit board of the light source is rotated between 10 and 25° about the x-axis of the vehicle coordinate system and/or up to 10° about the y-axis of the vehicle coordinate system and/or up to 10° about the z-axis of the vehicle coordinate system,
    the light window is rotated by up to 25° about the x-axis of the vehicle coordinate system, and
    where the x-y plane is parallel to the horizontal plane and/or the y-z plane is parallel to the vertical plane.

17. The lighting device according to claim 16, wherein the printed circuit board has a rectangular shape and runs parallel to the x-z plane, or
    the light emitters are arranged along a line which is parallel to the longer edge of the printed circuit board.

18. The lighting device according to claim 7, wherein the light guide, the light funnel, the light transmission unit or the light window is/are formed from plastic.

19. A lighting device of a rear view device of a motor vehicle, comprising:
    at least one light source with at least one light emitter for emitting light which can be coupled into and out of a light guide with at least one light funnel in order to pass at least through a part of a light transmission unit and illuminate an area adjacent to the motor vehicle of a road surface of the motor vehicle,
    wherein each light emitter is associated with a light funnel for bundling the light coupled out of each light funnel at a light window of the light transmission unit, determining an optical axis,
    each optical axis has an angle α of up to about 40° with respect to a plane with a road surface of the motor vehicle, a projector module for projecting a logo, symbol, message or warning onto the road surface, and
    an adjusting device for spatial adjustment of the projector module, the adjusting device comprising at least a first adjustment element which is arranged on the projector module or is formed with a projector module housing.

20. The lighting device according to claim 19, wherein the adjusting device has at least one translatory degree of freedom along at least one displacement axis and/or at least one rotational degree of freedom about at least one axis of rotation.

21. The lighting device according to claim 19, further comprising at least one of:
    an surrounding light, which is integrated into the projector module; and
    a maneuvering light, which is connectable to the projector module and/or provided in one unit with the projector module and/or formed as a module, which comprises a printed circuit board with the light source, the light guide associated with the light source and the projector module housing.

22. A lighting device of a rear view device of a motor vehicle, comprising:
    at least one light source with at least one light emitter in the form of an LED for emitting light which can be coupled into and out of a light guide with at least one light funnel in order to pass at least through a part of a light transmission unit and illuminate an area adjacent to the motor vehicle of a road surface of the motor vehicle,
    wherein a light funnel is associated with each light emitter in a one-to-one connection, so that the light emitted by each light emitter is guided within the associated light funnel to be bundled in the area of a light window of the light transmission unit acting as a lens, thus serving to provide homogeneous illumination of the area adjacent to the motor vehicle, and
    an optical axis (A) of each light beam emitted from the light emitters is defined and inclined, each optical axis (A) having an angle α of up to about 40° with respect to a horizontal plane for converging the light coupled out of each light funnel at a light window of the light transmission unit.

23. The rear view device according to claim 5, wherein the lighting device illuminates an area adjacent to the motor vehicle, provides a surrounding light, an proximity light, a maneuvering light, a puddle light, a logo light and/or a projector module.

24. The rear view device according to claim 23, wherein at least one of a support and adjusting device for adjusting a relative position of the projector module to the rear view device housing and/or motor vehicle is provided.

25. The view device according to claim 24, wherein at least one of:
    the support and/or adjusting device comprises a guide means, at least one latching element, an adjusting screw and/or a fixing screw,
    the support and/or adjusting device comprises at least one second adjusting element which is arranged on a retaining part for the projector module and/or the rear-view device housing or formed with the same, and
    the support and/or adjusting device comprises at least one fixing element for fixing the projector module in a position adjusted by means of the adjusting device.

26. The rear view device according to claim 23, wherein at least one of the surrounding light and the maneuvering light is movable with the projector module.

27. The rear view device according to claim 23, wherein the maneuvering light is arranged on a window area of the housing, the window area comprising at least one first colour-transparent partial area and at least one second opaque partial area.

* * * * *